United States Patent Office 3,553,245
Patented Jan. 5, 1971

---

3,553,245
CYANOMETHYLIDENE ANILINE COMPOUNDS
Max A. Weaver, John I. Dale III, and James M. Straley, Kingsport, Tenn., assignors to Eastman Kodak Company, Rochester, N.Y., a corporation of New Jersey
No Drawing. Original application Oct. 19, 1964, Ser. No. 404,955, now Patent No. 3,386,491, dated June 4, 1968. Divided and this application Apr. 2, 1968, Ser. No. 718,252
Int. Cl. C07c *121/70, 121/72;* D06p *3/70*
U.S. Cl. 260—465
8 Claims

ABSTRACT OF THE DISCLOSURE

Compounds having the formula $$\underset{Z}{\overset{NC}{>}}C=HC-R-\underset{R_1}{\overset{|}{N}}-CH_2CH_2SO_2CH_2CH_2-\underset{R_3}{\overset{|}{N}}-R_2-CH=C\underset{Z}{\overset{CN}{<}}$$

wherein Z is cyano, carbamoyl or alkoxycarbonyl; R and $R_2$ are p-phenylene groups; and $R_1$ and $R_3$ are alkyl, cyclohexyl, or phenyl groups are useful for dyeing hydrophobic textile materials.

---

This application is a divisional application of U.S. application Ser. No. 404,955 filed on Oct. 19, 1964 by Max A. Weaver, John I. Dale, III and James M. Straley for "Cyanomethylidene Tetrahydroquinoline Compounds," now U.S. Pat. 3,386,491.

This invention relates to certain water-insoluble methine compounds containing the cyanomethylidene group and which are particularly useful as dyes for textile materials such as polyester, cellulose acetate, and polyamide fibers.

The methine compounds have the general formula $$\underset{Z}{\overset{NC}{>}}C=HC-R-\underset{R_1}{\overset{|}{N}}-CH_2CH_2SO_2CH_2CH_2-\underset{R_3}{\overset{|}{N}}-R_2-CH=C\underset{Z}{\overset{CN}{<}}$$

wherein R and $R_2$ are the same or different and each represents p-phenylene or p-phenylene substituted, for example, with lower alkyl, e.g. methyl, ethyl, propyl, butyl; lower alkoxy, e.g. methoxy, ethoxy, propoxy; halogen, e.g. chlorine, bromine; lower alkanoylamino, e.g. acetamido, propionamido. Preferably the p-phenylene radical represented by R and $R_2$ contains not more than two substituents. Preferably, R and $R_2$ represent the same p-phenylene groups having the formula (structure showing phenylene ring with Y substituent at top and X at bottom)

wherein X, which is in the meta position in reference to the position of the nitrogen atoms to which R and $R_1$ and $R_2$ and $R_3$ are attached, is hydrogen, lower alkyl, particularly methyl, lower alkoxy, halogen, or lower alkanoylamino; and Y is hydrogen, lower alkyl, particularly methyl, lower alkoxy, or halogen.

$R_1$ represents a lower alkyl radical including unsubstituted and substituted lower alkyl, e.g. methyl, ethyl, butyl; lower hydroxyalkyl, e.g. β-hydroxyethyl; lower haloalkyl, e.g. β-chloroethyl, 3-brompropyl; lower alkoxyalkyl, e.g. γ-methoxypropyl; lower alkanoyloxyalkyl, e.g. β-acetoxyethyl; lower alkanoylaminoalkyl, e.g. γ-acetamido propyl; lower cyanoalkyl, e.g. β-cyanoethyl, lower dicarboximidoalkyl, e.g. β-succinimidoethyl, or $R_1$ and $R_3$ represents cyclohexyl, phenyl, or phenyl substituted with lower alkyl, e.g. p-toly; lower alkoxyphenyl, e.g. p-anisyl, halophenyl, e.g. m-chlorophenyl.

The groups $$-R-\underset{R_1}{\overset{|}{N}}- \text{ and } -\underset{R_3}{\overset{|}{N}}-R_2-$$

when taken collectively, are the same or different and each represents a substituted or unsubstituted tetrahydroquinolin-6-yl radical such as 1,2,3, 4-tetrahydroquinolin-6-yl, 2,7-dimethyl and 2,2,4,7-tetramethyl-1,2,3,4-tetrahydroquinolin-6-yl.

Z represents either cyano, carbamoyl, or lower alkoxycarbonyl such as $-COOCH_3$, $-COOC_3H_7$ and $$-COOC_2H_4CN$$

As illustrated in Example 1 below, in the symmetrical compounds contemplated by the formula the $$-R-\underset{R_1}{\overset{|}{N}}- \text{ and } -\underset{R_3}{\overset{|}{N}}-R_2-$$

radicals are identical. In the unsymmetrical compounds $$-R-\underset{R_1}{\overset{|}{N}}- \text{ and } -\underset{R_3}{\overset{|}{N}}-R_2-$$

are different as shown by Example 4.

Herein, lower alkyl, lower alkylene and the like mean that the carbon chain of the group is a straight or branched-chain of 1 to 4 carbon atoms.

The symmetrical intermediates used in preparing the methine compounds, that is where the groups R and $R_2$ and the groups $R_1$ and $R_3$ in the above general formula are the same, are prepared generally by reacting N-substituted anilines or 1,2,3,4-tetrahydroquinolines with divinyl sulfone in the presence of a little acetic acid. This reaction is illustrated as follows:

$$2R-\underset{R_1}{\overset{|}{N}}-H+(CH_2=CH)_2SO_2 \longrightarrow R-\underset{R_1}{\overset{|}{N}}-C_2H_4SO_2C_2H_4\underset{R_1}{\overset{|}{N}}-R$$

where R and $R_1$ correspond to the groups in the above general formula. An alternate method for the preparation of the compounds where R is phenyl or substituted phenyl is to react the corresponding primary amine with divinyl sulfone to give the bis compound and then to alkylate this intermediate.

The unsymmetrical intermediates, that is where the groups R and R₂ and/or the groups R₁ and R₃ are different, may be prepared by reacting one equivalent of the aromatic amine with one equivalent (or an excess) of divinyl sulfone to give the N-2-(vinylsulfonyl)ethyl intermediate which may be reacted with another equivalent of amine. This may be illustrated by the following reaction:

$$RN-H+(CH_2=CH)_2SO_2 \longrightarrow R-\underset{\underset{R_1}{|}}{N}-C_2H_4SO_2CH=CH_2$$

$$R-\underset{\underset{R_1}{|}}{N}-C_2H_4SO_2CH=CH_2+H-\underset{\underset{R_3}{|}}{N}-R_2 \longrightarrow$$

$$R-\underset{\underset{R_1}{|}}{N}-C_2H_4SO_2C_2H_4-\underset{\underset{R_3}{|}}{N}-R_2$$

where R, R₁, R₂, and R₃ correspond to the groups in the above general formula, but where the groups R and R₂ and/or the groups R₁ and R₃ are different. The resulting intermediates are then converted to the bis aldehydes by reaction with POCl₃ and dimethylformamide, following which the bis-aldehydes are reacted with nitriles containing an active methylene group of formula NC—CH₂—Z such as malononitrile or alkylcyanoacetates such as methylcyanoacetate to yield the desired compounds containing the cyanomethylidene group.

The methine compounds can be used for dyeing textile materials including synthetic polymer fibers, yarns and fabrics giving fast brilliant yellow shades when applied by conventional dyeing methods to polyester fibers. The methine compounds also have good affinity for cellulose ester and polyamide fibers. When the methine compounds are used for dyeing such hydrophobic materials, they should be free of water-solubilizing groups such as sulfo and carboxyl groups. In general, the dyes have good fastness, for example, to light, washing, gas (atmospheric fumes) and sublimation.

The following examples will serve to illustrate the preparation of representative methine compounds and intermediates of our invention.

EXAMPLE 1

(A) Preparation of bis[2-(N-ethyl-m-toluidino)ethyl]sulfone 27.0 g. of N-ethyl-m-toluidine, 11.8 g. divinylsulfone, 5 cc. glacial acetic acid, and 50 cc. toluene were refluxed together for 24 hr. The toluene and acetic acid were removed under vacuum and the residue taken up in 150 ml. of hot alcohol. This solution was chilled for 2 hr. at near 0° C. and the white crystalline product collected by filtration. Yield—21.4 g., M.P. 58–61° C. A sample recrystallized once from alcohol melted at 65–67° C.

(B) Preparation of the bis-aldehyde from 1(A)

9.7 g. bis[2-(N-ethyl-m-toluidine)ethyl]sulfone was dissolved in 15 cc. dry dimethyl formamide. The solution was cooled and 5 cc. POCl₃ was added below 25° C. When addition was complete, the reaction was heated 1 hr. on the steam bath. It was then poured onto about 200 cc. ice-water mixture. On basification with 50% aqueous sodium hydroxide solution a sticky product separated, which solidified on standing. The material was filtered and recrystallized from 250 ml. of alcohol. Yield—8.4 g., M.P. 150–152° C. After another recrystallization from alcohol, the material melted at 152–153° C. The aldehyde has the formula:

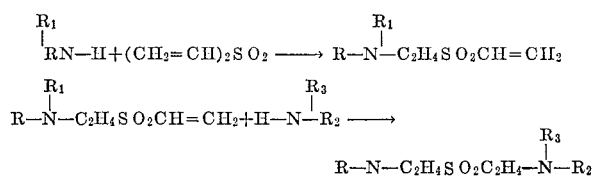

(C) Preparation of the dye 2.22 g. of the product from (B) above, 0.66 g. malononitrile, 3 drops piperidine, and 35 cc. alcohol were refluxed together for 1 hr. The mixture was allowed to cool to room temperature. The yellow dye was collected by filtration, washed with a little alcohol, and dried in air. Yield—2.3 g., M.P. 160–162° C. This dye has the following structure:

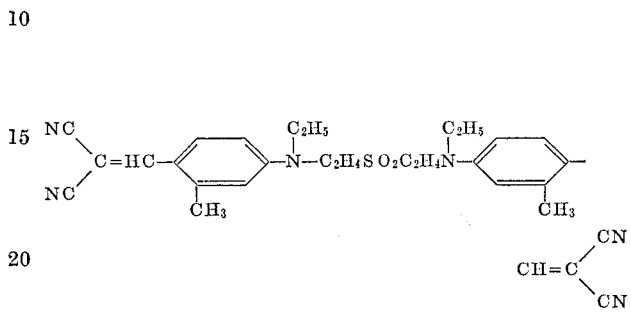

It dyes polyester and cellulose acetate fabrics in bright yellow shades of outstanding fastness properties.

EXAMPLE 2

(A) Preparation of bis[2-(N-2-hydroxyethyl-m-toluidine)ethyl]sulfone 30.2 g. N-2-hydroxyethyl-m-toluidine, 11.8 g. divinyl sulfone, 10 cc. acetic acid, and 50 cc. toluene were refluxed together for 24 hr. The toluene and acetic acid were removed under vacuum to leave a quantitative yield of the product, which was a viscous oil.

(B) Preparation of 4,4'-sulfonylbis(ethylene-N-2-chloroethylimino)-o-tolualdehyde 21.0 g. of the above intermediate from 2(A) were dissolved in 40 cc. dry dimethylformamide. The solution was cooled and 21 cc. POCl₃ was added below 30° C. The reaction mixture was then heated 2 hours on the steam bath and poured onto about 300 cc. ice-water mixture. This mixture was made basic with 50% aqueous sodium hydroxide solution, and the product precipitated as a sticky mass. The water was decanted and the residue recrystallized from 300 cc. alcohol. Yield—13.0 g., M.P. 124–128° C. One recrystallization from methyl Cellosolve increased the M.P. to 130–132° C.

(C) Preparation of the dye from 2(B)

2.56 g. of the above aldehyde (2B), 0.66 g. malononitrile, 3 drops piperidine, and 25 cc. alcohol were refluxed together for 1 hr. The mixture was allowed to cool to room temperature and filtered. It dyes polyester fibers, cellulose acetate, and Verel modacrylic bright yellow shades of excellent fastness.

EXAMPLE 3

(A) Preparation of bis[2-(m-toluidino)ethyl]sulfone 42.8 g. m-toluidine, 11.8 g. divinylsulfone, 5 cc. acetic acid, and 110 ml. toluene were refluxed together for 24 hr. The toluene and excess m-toluidine were removed under reduced pressure. The residue was taken up in 150 ml. of alcohol and on cooling this solution a white solid was obtained, which was collected by filtration and dried in air. Yield—25.5 g., M.P. 82–85° C. A sample of this product recrystallized from alcohol melted at 87–88.5° C.

(B) Preperation of bis 2-(N-2-cyanoethyl-m-toluidino) ethyl sulfone 10 g. bis 2-(m-toluidino)ethyl sulfone, 5 cc. acetic acid, 5 cc. acrylonitrile, 0.5 g. cupric acetate monohydrate, and 1.0 g. copper bronze were heated together in an autoclave at 150° C. for 10 hr. The mixture was filtered and the acetic acid and excess acrylonitrile removed under vacuum. The product was a dark viscous oil, yield—13.0 g. The product had the following structure:

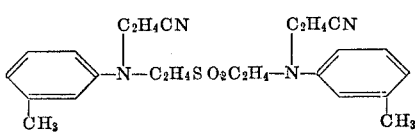

(C) and (D)

The aldehyde and the dye were prepared by using the same procedures as given in 1(B) and 1(C) above. This dye had the following structure:

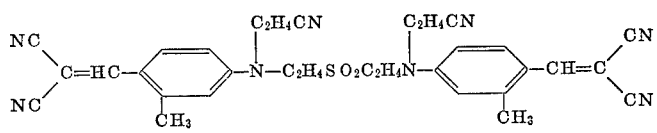

were refluxed together for 24 hr. The solvent was removed under vacuum and the excess N-ethyl-m-toluidine distilled to give a very viscous residue which could not be made to crystallize. Yield—8.7 g. This material had the following structure:

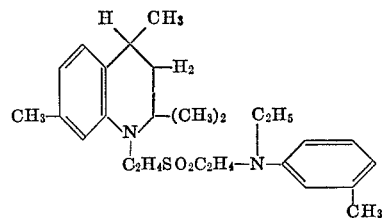

(C) Preparation of the bis-aldehyde from material prepared in 4(B) above 8.3 g. of product from 4(B) was dissolved in 30 cc. dry dimethyl formamide. The solution was cooled and 5 cc. POCl₃ added dropwise at below 30° C. After addition was complete the solution was heated 1 hr. on the steam bath and then drowned into 100 cc. ice-water mixture. The mixture was made basic with 50% aqueous sodium hydroxide solution, and a sticky yellow product resulted which solidified on standing. The material was filtered, washed with water and dried in air. Yield—8.3 g.

(D) Preparation of the dye 2.44 g. bis-aldehyde from 4(C) above, 0.66 g. malononitrile, 5 drops piperidine, 50 ml. alcohol were refluxed together for 1 hr. On cooling to room temperature an orange solid resulted, which was collected by filtration, washed with a little alcohol, and dried in air. Yield—2.0 g., M.P. 130–135° C. One recrystallization from alcohol increased the M.P. to 140–143° C. This unsymmetrical dye has the following structure:

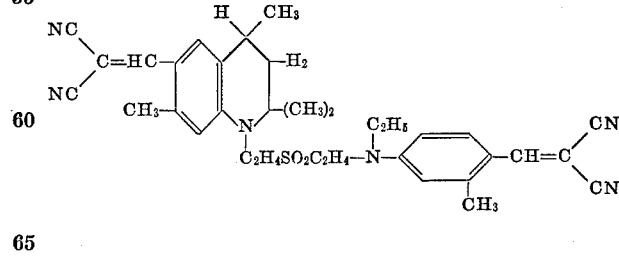

EXAMPLE 4

(A) Preparation of 2,2,4,7-tetramethyl-1-1-(2-vinyl-sulfonyl)ethyl-1,2,3,4-tetrahydroquinoline 37.8 g. 2,2,4,7-tetramethyl-1,2,3,4-tetrahydroquinoline in 50 cc. toluene was added dropwise to a refluxing solution of 25.9 g. divinylsulfone, and 5 cc. acetic acid in 50 cc. toluene over a period of 20 minutes. After refluxing 24 hr., the solvent was removed under vacuum and the unreacted starting materials distilled. There was obtained about 38 g. of material boiling at 71–117° C. at 1.1/1.5 mm. Hg. The distillation was discontinued and the residue taken up in 100 ml. of hot alcohol. The desired product separated out as a white solid on cooling, which was filtered, washed with a little alcohol and dried in air. Yield—22 g., M.P. 109–112° C. This material has the following structure:

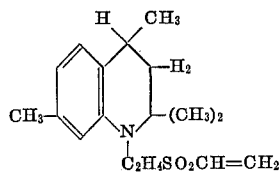

(B) Preparation of 1-ethylene-tetrahydro-2,2,4,7-tetramethyl - 1 - quinolyl - N - ethylene-N-ethyl-m-toluidine sulfone 6.22 g. of the product from 4(A) above, 5.40 g. of N-ethyl-m-toluidine, 2 cc. acetic acid, and 50 cc. toluene

EXAMPLE 5

(A) Preparation of N-ethyl-N-(2-vinylsulfonyl) ethyl-m-toluidine 27.0 g. N-ethyl-m-toluidine, 23.6 g. divinylsulfone, 5 cc. glacial acid, and 100 ml. of toluene were refluxed together for 12 hr. The product was distilled under reduced pressure. Yield—25.6 g., B.P. 157–159° C. at 0.35 mm. Hg, $n_D^{20}$—1.5607.

(B) Preparation of 1-ethylene-tetrahydro-7-methyl-1-quinolyl-N-ethylene-N-ethyl-m-toluidine sulfone 25.3 g. N-ethyl-N-(2-vinylsulfonyl)ethyl-m-toluidine, 29.4 g. 7-methyl-1,2,3,4-tetrahydroquinoline, 10 cc. glacial acetic acid, and 200 cc. toluene were refluxed together for 24 hr. The toluene and excess 7-methyl-1,2,3,4-tetrahydroquinoline were removed under vacuum to yield 40 g. of product, which did not crystallize. It had the following structure.

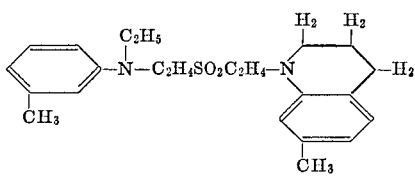

(C) and (D) The preparation of the aldehyde and the dye was carried out as in 1(B) and 1(C) above The unsymmetrical dye had the following structure:

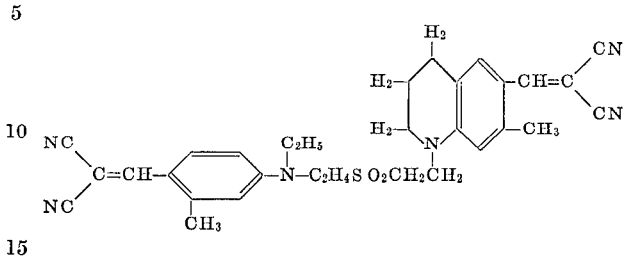

The intermediates for the following Examples 6–24 listed in Table I were prepared as in Examples 1(A), 2(A), or 3(A) and (B). The aldehydes were prepared by the methods illustrated in Examples 1(B) and 2(B). The dyes were made as in Example 1(C). The dyes had the structures indicated in the table, referring to the general formula at the beginning of this specification, and dye polyesters to bright yellow shades. The position specified for the substituted phenylene groups represented by R and $R_2$ refers to the nitrogen atom to which R and $R_1$ and $R_2$ and $R_3$ are attached.

TABLE I (SYMMETRICAL DYES)

| Example No.: | R and $R_2$ | $R_1$ and $R_3$ | Z | Preparative method of intermediate |
|---|---|---|---|---|
| 6 | p-Phenylene | $-C_2H_5$ | $-CN$ | 1(a). |
| 7 | m-Methyl-p-phenylene | $-CH_3$ | $-CN$ | 1(a). |
| 8 | do | $-CH_3$ | $-\overset{O}{\underset{\parallel}{C}}-NH_2$ | 1(a). |
| 9 | do | $-CH_2CH_2CH_2CH_3$ | $-\overset{O}{\underset{\parallel}{C}}-OCH_3$ | 1(a). |
| 10 | do | $-C_2H_5$ | $-\overset{O}{\underset{\parallel}{C}}-OCH_2CH(CH_3)_2$ | 1(a). |
| 11 | p-Phenylene | $-C_2H_4Cl$ | $-CN$ | 1(a). |
| 12 | do | $C_2H_4CN$ | $-CN$ | 3(a and b). |
| 13 | m-Chloro-p-phenylene | $-C_2H_4CN$ | $-CN$ | 3(a and b). |
| 14 | Tetrahydroquinoline | Part of ring | $-CN$ | 1(a). |
| 15 | 2,7-dimethyltetrahydroquinoline | do | $-CN$ | 1(a). |
| 16 | 7-methyltetrahydroquinoline | do | $-CN$ | 1(a). |
| 17 | m-Methoxy-p-phenylene | $-C_2H_5$ | $-CN$ | 1(a). |
| 18 | do | $-C_6H_5$ | $-CN$ | 1(a). |
| 19 | o-Methyl-p-phenylene | $-C_2H_5$ | $-CN$ | 1(a). |
| 20 | m-Methyl-p-phenylene | $-C_2H_4-OCH_3$ | $-CN$ | 1(a). |
| 21 | do | $-C_2H_4-NH\overset{O}{\underset{\parallel}{C}}CH_3$ | $-CN$ | 1(a). |
| 22 | do | $-C_2H_4-N\begin{smallmatrix}\overset{O}{\underset{\parallel}{C}}-CH_2\\ \vert\\ C-CH_2\\ \underset{\parallel}{O}\end{smallmatrix}$ | $-CN$ | 1(a). |
| 23 | p-Phenylene | $-C_2H_4-\overset{O}{\underset{\parallel}{C}}OCH_3$ | $-CN$ | 1(a). |
| 24 | m-Acetamido-p-phenylene | $-C_2H_5$ | $-CN$ | 1(a). |

Unsymmetrical methine compounds were prepared by the methods of Examples 4((A–D) and 5(A–D) and have the formulas shown in the following Table II, referring to the above general formula, and dye polyester fabrics to fast bright yellow shades.

EXAMPLE 40

4,4-[sulfonylbis(ethylene - N-ethylimino)]di-o-tolualdehyde (1.11 g.), 2-cyanoacetamide (0.42 g.), 3 drops piperidine, and 15 ml. ethanol were refluxed together for one hour. The product was collected, washed, and dried. This

TABLE II (UNSYMMETRICAL DYES)

| Ex. No. | R | R₁ | R₂ | R₃ | Z |
|---|---|---|---|---|---|
| 25 | p-Phenylene | —C₂H₅ | m-Methyl-p-phenylene | —C₂H₅ | —CN |
| 26 | m-Methyl-p-phenylene | —C₂H₅ | do | —CH₂CH₂CH₂CH₃ | —CN |
| 27 | p-Phenylene | —C₂H₄Cl | do | —C₂H₄Cl | —CN |
| 28 | 1,2,3,4-tetrahydroquinoline | Part of a ring | do | —C₂H₅ | —C(O)—NH₂ |
| 29 | do | do | p-Phenylene | —CH₃ | —C(O)—OCH₃ |
| 30 | 2,7-dimethyltetrahydroquinoline | do | m-Methoxy-p-phenylene | —C₂H₅ | —CN |
| 31 | 2,2,4,7-tetramethyl tetrahydroquinoline | do | 7-methyltetrahydroquinoline | Part of a ring | —CN |
| 32 | do | do | 2,7-dimethyltetrahydroquinoline | do | —CN |
| 33 | m-Methoxy-p-phenylene | —C₂H₅ | m-Chloro-p-phenylene | —C₂H₅ | —CN |
| 34 | do | —C₆H₅ | p-Phenylene | —C₂H₄—OCH₃ | —CN |
| 35 | m-Methyl-p-phenylene | Cyclohexyl | m-Methyl-p-phenylene | —C₂H₄—Cl | —CN |
| 36 | m-Methoxy-p-phenylene | 4'methoxy phenyl | do | —C₂H₅ | —CN |

The following examples further illustrate the synthesis of the methine compounds of the invention.

EXAMPLE 37

1.11 g. 4,4'-[sulfonylbis(ethylene-N-ethylimino)]di-o-tolualdehyde, 0.50 g. methyl cyanoacetate, 3 drops piperidine, and 15 ml. ethanol were refluxed together for 1 hour. The reaction mixture was allowed to cool and the product collected by filtration, washed with ethanol and air dried. There was obtained 1.3 g. of yellow dye having the following structure:

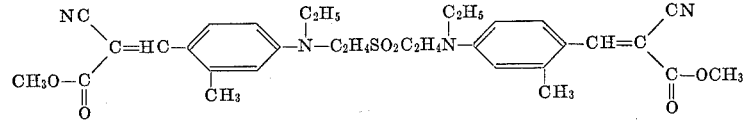

EXAMPLE 38

2.56 g. 4,4'-[sulfonylbis(ethylene-N-2-chloroethylimino)]-o-tolualdehyde, 1.41 g. of iso-butyl cyanoacetate, 5 drops piperidine, and 25 ml. ethanol were refluxed together for 1 hour. After allowing to cool, the yellow crystals were collected by filtration, washed with ethanol and air dried. There was obtained 2.8 g. of dye which dyed cellulose acetate and polyester fibers bright shades of yellow. It had the following structure:

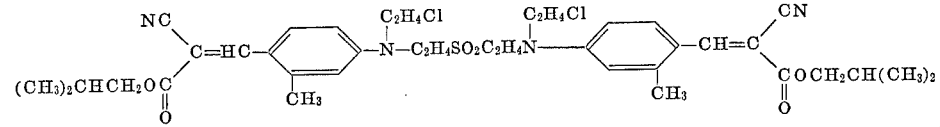

EXAMPLE 39

2.44 g. tetrahydro-2,2,4,7-tetramethyl-1-{2-[2-(4-formyl-N-ethyl - m - (toluidino)ethylsulfonyl]-ethyl}-6-quinoline-carboxaldehyde [from Example 4(C)], and 20 ml. ethanol were reacted and worked up exactly as in Example 36 to give a yellow dye of the following structure:

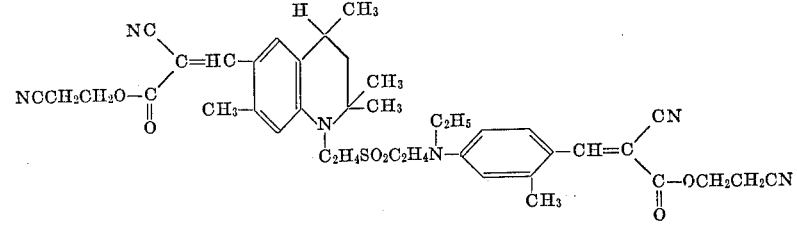

material dyed cellulose acetate and polyester fibers bright yellow shades and had the following structure:

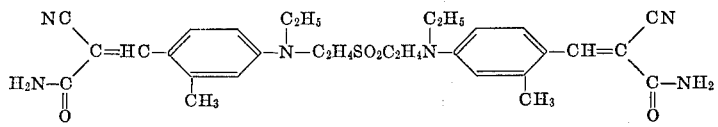

The methine compounds of the invention may be used for dyeing hydrophobic fibers such as linear polyester, cellulose acetate, polyamide, etc. fibers in the manner described in U.S. Pats. 2,880,050, 2,757,187 and 3,043,827. The following example illustrates methods by which the methine compounds of the invention can be used to dye textile materials.

0.1 gram of the dye is dissolved in the dye pot by warming in 5 cc. of ethylene glycol monomethyl ether. A 2% Igepon T and 0.5% sodium lignin sulfonate aqueous solution is added, with stirring, until a fine emulsion is obtained. Water is then slowly added to a total volume of 200 cc. Three cc. of Dacronyx (a chlorinated benzene emulsion) are added and 10 grams of a textile fabric made of poly(ethylene terephthalate) polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soda-ash solution. After scouring, the fabric is rinsed with water and dried.

The above example illustrates how the methine compounds of the invention can be applied from aqueous dispersions in the manner of the so-called "dispersed dyes." However, coloration can also be effected, for example, by incorporating the methine compounds into the spinning dope or melt and spinning the fiber as usual.

Cellulose esters which can be dyed with the methine compounds include cellulose aliphatic carboxylic acid esters having 2 to 4 carbon atoms in the acid groups thereof, by which we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new methine compounds of our invention. Poly(ethylene terephthalate) fibers sold under the trademarks "Kodel," "Dacron" and "Terylene" and poly(1,4-cyclohexylenedimethylene terephthalate fibers sold under the trademark "Kodel" in the form of filaments, yarn and fabric, for example, are illustrative of the polyester textile materials that can be dyed. Poly(1,4-cyclohexylenedimethylene terephthalate) polyester fibers are more particularly described in U.S. Pat. 2,901,446. Poly(ethylene terephthalate polyester fibers are described in U.S. Pat. 2,465,319. The polymeric linear polyester materials disclosed in U.S. Pats. 2,945,010, 2,957,745 and 2,989,363, for example, can be dyed. The linear aromatic polyester materials specifically named have a melting point of at least 200° C.

Examples of the polyamide fibers that can be dyed with the compounds of the invention are those consisting of Nylon 66, made by the polymerization of adipic acid and hexamethylenediamine, Nylon 6, prepared from epsilon-amino-caproic acid lactam, and Nylon 8.

The invention has been described in detail with particular reference to preferred embodiments thereof, but it will be understood that variations and modifications can be effected within the spirit and scope of the invention as described hereinabove, and as defined in the appended claims.

We claim:

1. A compound having the formula

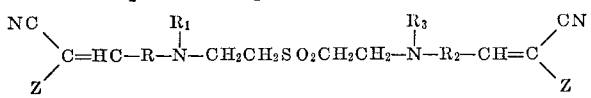

wherein
R and $R_2$ are the same or different and each is a p-phenylene group having the formula

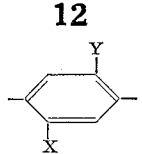

wherein X and Y are each hydrogen, lower alkyl, lower alkoxy, chlorine or bromine;

$R_1$ and $R_3$ are the same or different and each is lower alkyl, lower hydroxyalkyl, lower chloroalkyl, lower bromoalkyl, lower alkoxyalkyl, lower alkanoyloxyalkyl, lower alkanoylaminoalkyl, lower cyanoalkyl, cyclohexyl, phenyl, lower alkylphenyl, lower alkoxyphenyl, chlorophenyl, or bromophenyl; and Z is cyano, carbamoyl, lower alkoxycarbonyl, or lower cyanoalkoxycarbonyl.

2. A compound according to claim 1 having the formula

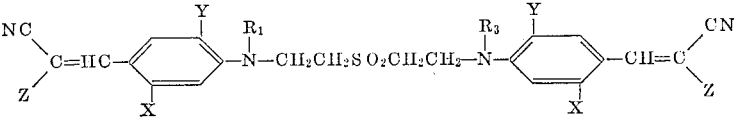

wherein $R_1$ and $R_3$ each is lower alkyl, lower hydroxyalkyl, lower chloroalkyl, lower bromoalkyl, lower cyanoalkyl, or lower alkanoyloxyalkyl; and Z is cyano.

3. A compound according to claim 2 wherein
$R_1$ and $R_3$ each is lower alkyl;
X is hydrogen or methyl; and
Y is hydrogen.

4. A compound according to claim 1 having the formula

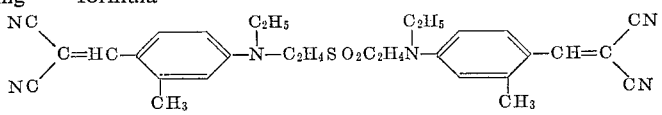

5. A compound according to claim 1 having the formula

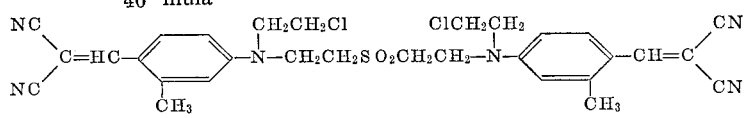

6. A compound according to claim 1 having the formula

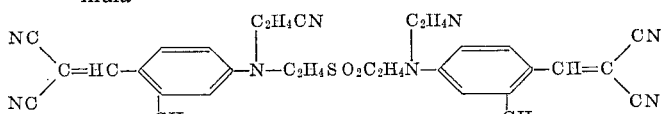

7. A compound according to claim 1 having the formula

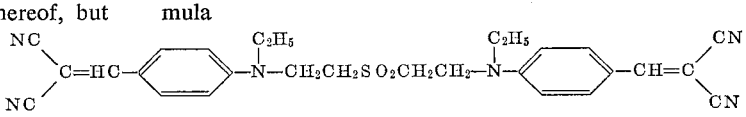

8. A compound according to claim 1 having the formula

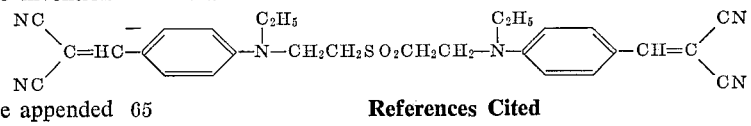

References Cited

UNITED STATES PATENTS 3,189,641   6/1965   Brack et al. _____ 260—465

CHARLES B. PARKER, Primary Examiner

D. H. TORRENCE, Assistant Examiner

U.S. Cl. X.R.

8—4, 55, 57; 117—138.8, 144; 260—286, 287, 289, 570.5

PO-1050
(5/69)

UNITED STATES PATENT OFFICE
CERTIFICATE OF CORRECTION

Patent No. 3,553,245      Dated January 5, 1971

Inventor(s) Max A. Weaver, John I. Dale, III, James M. Straley

It is certified that error appears in the above-identified patent and that said Letters Patent are hereby corrected as shown below:

Column 2, line 14, "p-toly;" should be --- p-tolyl; ---.

Column 3, lines 10 through 19, the formula should read:

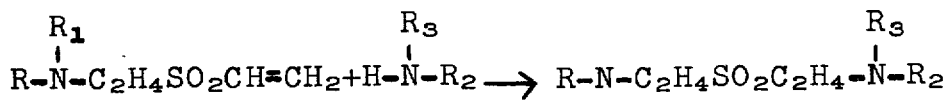

Column 12, line 8, after "and each is" add --- hydrogen ---

Column 12, Claim 6, the formula should read:

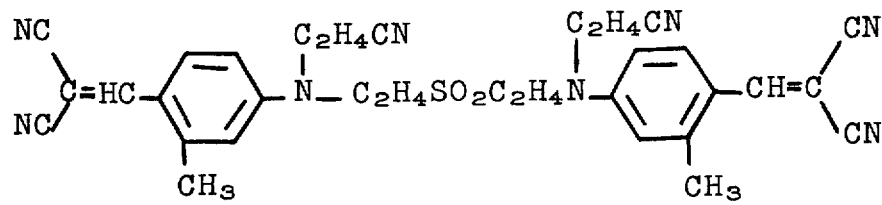

Signed and sealed this 17th day of August 1971.

(SEAL)
Attest:

EDWARD M. FLETCHER, JR.
Attesting Officer

WILLIAM E. SCHUYLER,
Commissioner of Paten